United States Patent [19]

Fellner et al.

[11] Patent Number: 5,142,267
[45] Date of Patent: Aug. 25, 1992

[54] LEVEL SENSOR WHICH HAS HIGH SIGNAL GAIN AND CAN BE USED FOR FLUIDS PARTICULARLY CHEMICALLY CORROSIVE FLUIDS

[75] Inventors: Siegfried Fellner, Preitenegg; Gerhard Bisail, Deutschlandsberg, both of Austria

[73] Assignee: Siemens Aktiengesellschaft, Munich

[21] Appl. No.: 522,120

[22] Filed: May 11, 1990

[51] Int. Cl.⁵ .............................. H01C 7/10
[52] U.S. Cl. .................. 338/23; 338/22 R; 338/27; 338/86; 338/94
[58] Field of Search ............... 338/22 R, 22 SD, 23, 338/222, 231, 27, 38, 80–86, 94, 28; 340/618, 622; 73/304 R, 295

[56] References Cited

U.S. PATENT DOCUMENTS

| | | | |
|---|---|---|---|
| 3,863,210 | 1/1975 | Roland et al. | 323/369 |
| 3,896,409 | 7/1975 | Micheli et al. | 338/28 |
| 4,276,536 | 6/1981 | Wisnia | 338/23 |
| 4,647,895 | 3/1987 | Howng | 338/22 R |

FOREIGN PATENT DOCUMENTS

| | | |
|---|---|---|
| 0061550 | 10/1982 | European Pat. Off. |
| 2429483 | 5/1978 | Fed. Rep. of Germany |
| 3232333 | 6/1984 | Fed. Rep. of Germany |

OTHER PUBLICATIONS

Siemens Zeitschrift, pp. 138–145, Feb. 1965.

Primary Examiner—Marvin M. Lateef
Attorney, Agent, or Firm—Hill, Van Santen, Steadman & Simpson

[57] ABSTRACT

A PTC-resistor which is a temperature dependent electrical thermistor of semiconductor ferro-electric ceramic which is provided with power leads and serves as a sensor element is directly fused into glass. The power leads are welded to metal coatings formed on the PTC-resistor which are stable at the temperature occurring when the PTC-resistor is fused. The metal coatings are made of aluminum which are formed by aluminum silk screened metallizations which have a thickness of 50 μm or more.

2 Claims, 1 Drawing Sheet

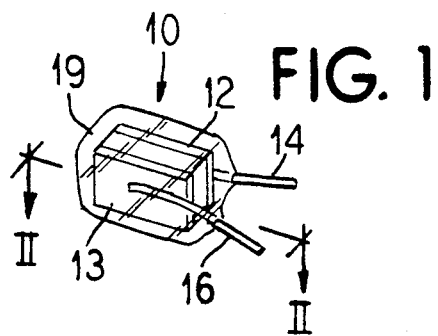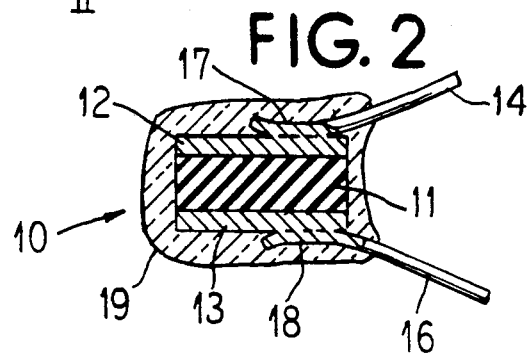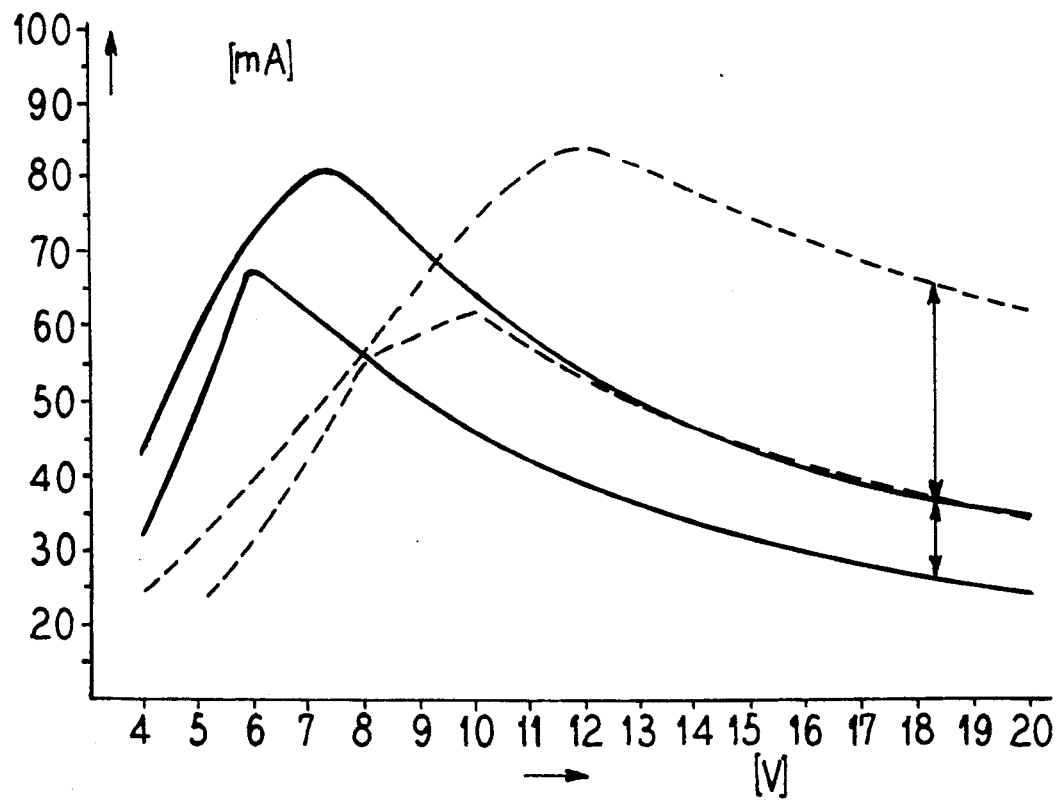

LEVEL SENSOR WHICH HAS HIGH SIGNAL GAIN AND CAN BE USED FOR FLUIDS PARTICULARLY CHEMICALLY CORROSIVE FLUIDS

BACKGROUND OF THE INVENTION

1. Field of the Invention

This invention is related in general to a level sensor which has high signal gain for fluids particularly chemically corrosive fluids and comprises a PTC-resistor formed with power leads that are attached to aluminum layers and which is encased in glass to form the sensor element.

2. Description of Related Art

The use of PTC-resistors for checking levels of fluid is known. A specific embodiment of a level sensor is described in publication Siemens-Zeitschrift, No. 2, February 1965, Pages 138-145.

PTC-resistors are temperature dependent electrical resistors (thermistors) made of semiconducting ferro-electric ceramic. It is characteristic of them that there is a steep rise of resistivity in the vicinity of the Curie temperature of the ferro-electric material. It is important for the application that the start of the nearly discontinuous rise of the resistance is several powers of 10 which is characterized by the reference temperature that approximately corresponds to the ferro-electric Curie temperature. At present, types of PTC-resistors which have reference temperatures to about +250° C. are available. Below the Curie temperature, the PTC-resistors are low impedance.

The temperature of a PTC-resistor is defined first, by the temperature of its environment and second, by the Joule effect developed in the PTC-resistor itself. Which of these two contributions is dominant in the specific application depends on the electrical load and on the heat elimination conditions. When a voltage U is applied to the PTC-resistor and a current I flows through it, then a power P=U I exists in the resistor and the power is developed as heat. The temperature of the PTC-resistor $T_K$ then rises until a condition is reached where the same amount of heat is generated as is radiated and conducted to the environment. The PTC-resistor is then in thermal equilibrium with its environment. The relationship $$UI = \frac{T_K - T_U}{W}$$

is then valid wherein $T_U$ represents the ambient temperature and W is the thermal resistance.

When used as a level sensor, the PTC-resistor is operated with a fixed voltage which is adequate to heat it above the reference temperature. With a constant voltage, the current through the PTC-resistor is a measure of the existing conditions of thermal conduction. When the thermal resistance W changes then changes in power occur in the PTC-resistor and as a result, changes in the current occur which can be used to detect such changes. If the PTC-resistor is immersed into a fluid, the current power consumption rises because the PTC-resistor lowers its resistance due to the increased cooling effect of the fluid. Based on this result, level sensors can be designed which can signal level conditions such as "fluid present/not present".

The thermal resistance W is approximately additive and is composed of a part associated with the ambient temperature and a part associated with the PTC-resistor in its envelope. An optimum signal relationship is consequently obtained according to the above equation in the case of a low ambient temperature, a high reference temperature and good thermal coupling of the PTC-resistor to the environment. Unfortunately, the use of PTC-resistors having high reference temperatures is impossible in many applications. With increases of the reference temperature, the power consumption in the immersed condition also increases which leads to undesired current peaks. Also many ambient media are not chemically stable under high temperature conditions. At reference temperatures of 200° C. the soldered connection between the power lead wires and the PTC-resistors will melt.

In the known level sensor wherein the PTC-resistor is integrated into a glass housing, wherein a layer of air is located between the PTC-resistor and the glass housing, an adequate signal relationship only results with a fluid temperature up to about 50° C. Although level sensors for higher fluid temperatures are known from the prior art as, for example, from German Pat. No. 32 32 333, these are designed in a completely different manner and are constructed in a significantly more involved and complicated manner than the specially simple glass encapsulated level sensors of the invention.

In the known level sensor which is introduced into a glass housing, the two demands for tight integration of the PTC-resistor and good thermal coupling to the environment are essentially resolved separately from each other. The glass housing protects the PTC-resistor whereas the outward transfer of the heat occurs mainly by way of the power leads. A first power lead wire has a flat head into which the miniature PTC-resistor which is only about 1.3 mm wide and 0. mm thick is pressed using a spring clip which is secured to a second power lead wire. The PTC-resistor itself has a firmly adhering metal coat applied barrier free which in addition to causing the electrical contact also causes good thermal contact with the flat head of the power lead wire. As has been mentioned, however, practice has shown that a thermal coupling only by using the power lead wires does not assure an adequate signal relationship for ambient temperatures of more than 50° C.

See also U.S. Pat. No. 4,276,536, U.S. Pat. No. 3,863,210, German No. 24 29 483, and European patent application no. 0,061,550.

SUMMARY OF THE INVENTION

It is an object of the present invention to provide a level sensor for checking the level of a fluid and which has an especially simple construction and which assures the highest possible coupling out of the heat which is generated by the PTC-resistor and which due to the signal gain which results also allows the use with fluids which have higher temperature than previously used.

It is a feature of the present invention that the level sensor of the invention comprises a PTC-resistor which is directly fused into glass.

The invention is based on the recognition that an additional outward transfer of the heat of the PTC-resistor PTC-resistor can be obtained if it is fused into glass so that the heat is directly conducted from the PTC-resistor through the glass housing to the surrounding medium without a heat blocking air layer. The advantage of an improved signal amplitude however, can only be achieved when the contact to the PTC-resistor to the power leads considering the fusing of the glass is first, temperature resistant and second, is compatible with the PTC-resistor, in other words, is free of barrier layers. The invention satisfies both of these conditions in a very simple manner.

The miniature PTC-resistor of the invention, for example, is fused into glass at approximately 700° C. Standard soldered connections will not withstand such temperature. The power leads are therefore connected to metal layers coated on the PTC-resistor with resistance welding. This, however, is not possible with the metal coatings of the PTC-resistor of the known level sensor which are composed of three layers. In such structures, layers of chromium, nickel and, finally, silver which are approximately 1 μm thick are successively vapor-deposited onto the surface of the PTC-resistor to form the contacts. These layers of the prior art however, are far too thin for a welding process and up to 90% of them are burned off at a high welding temperature. The thicknesses of the layers can also not be simply significantly thickened since the various metals each have a respectively different coefficient of thermal expansion which causes the layers to peel off or, respectively, cause the entire metal coating to rupture under welding conditions. Also, not every weldable surface can be used as a metal coating which is compatible with a PTC resistor.

In the invention, it has proven especially advantageous to provide an aluminum coating which is approximately 50 μm thick is applied with a silk screening method onto the opposite surfaces of the PTC-resistors to form the surfaces which are to be contacted. The aluminum silk screening metallization first is weldable and second, is free of barrier layers. The thickness of the aluminum layer is selected to be large enough so that the metal coat melts at desired welding temperatures of approximately 900° C., but does not excessively burn off.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the level sensor of the invention;

FIG. 2 is a sectional view taken on line II—II; and

FIG. 3 is a plot of the current-voltage characteristic of a PTC-resistor in a known level sensor and in a level sensor according to the invention.

DESCRIPTION OF THE PREFERRED EMBODIMENTS

FIG. 3 shows plots of curves of the current-voltage characteristics from a PTC-resistor in the known prior art level sensor as well as the level sensor of the invention, each shown, respectively in air and in fluid.

The solid line curves in FIG. 3 shows the characteristics of the known level sensor and the lower curve illustrates the characteristic referred to as the non-immersed condition (air, −25° C.). The upper solid line curve has a noticeably higher power consumption and produces the characteristic of the level sensor in its immersed condition (oil, +50° C.). The power differences shown by the arrow at approximately 18 volts indicates the power difference that can be detected with an amplifier which follows the resistance.

The dash lines illustrate the PTC-resistor of the invention which is directly fused in glass as shown in FIGS. 1 and 2 with the lower curve being the non-immersed condition and the upper curve being the immersed condition in oil at +50° C. It is seen that the PTC-resistor according to the invention fused in glass has a signal relationship which is approximately twice as great as that in the prior art level sensor. Note, the arrow between the dash lines is much longer than the arrow between the solid solids at 18 volts. The length of the arrow between the dash lines indicates the improved signal gain which is capable of supplying an adequate useful signal even for fluid temperatures under 100° C.

FIG. 1 is a perspective view of the PTC-resistor according to the invention and

FIG. 2 is a sectional view taken on II—II from FIG. 1. The PTC-resistor 10 comprises a resistor 11 which has attached to opposite sides thereof aluminum layers 12 and 13 which may be applied by aluminum silk screen metallization for example. Input leads 14 and 16 have portions 17 and 18 which are welded to the metal aluminum layers 12 and 13 at a welding temperature of approximately 900° for example. After the leads 12 and 13 are attached, the resistor including the ends 17 and 18 of the leads 12 and 13 are encapsulated in glass 19 as shown.

Although the invention has been described with respect to preferred embodiments, it is not to be so limited as changes and modifications can be made which are within the full intended scope of the invention as defined by the appended claims.

We claim as our invention:

1. A level sensor for liquids, particularly chemically aggressive liquids, comprising a PTC-resistor that is provided with leads and is mounted in a glass sheath to form a sensor element, whereby the leads are welded to metal coatings on the PTC-resistor, the improvement comprising, wherein said metal coatings of the PTC-resistor are aluminum which are silk screened metallizations; and in that the PTC-resistor together with the aluminum silk screened metallizations and leads are directly fused into said glass sheath, so that direct intimate contact is made between said PTC-resistor and the fused glass.

2. A level sensor according to claim 1, characterized in that said aluminum silk screened metallizations have thicknesses of approvimately 50 μm.

* * * * *